Patented Apr. 1, 1930

1,752,998

UNITED STATES PATENT OFFICE

KARL H. T. PFISTER, OF TACONY, PENNSYLVANIA, ASSIGNOR TO ROHM & HAAS COMPANY, A CORPORATION OF DELAWARE

METHOD OF REPLACING HALOGEN GROUPS IN ORGANIC COMPOUNDS BY AMINO GROUPS

No Drawing.    Application filed December 23, 1925. Serial No. 77,268.

Various methods of replacing a halogen group in an organic compound by an amino group have been suggested, from time to time, but these methods are slow and complicated. My present invention relates particularly to an aromatic compound having a halogen group activated by another substituent, i. e., under the influence of another so-called negative group, especially a nitro group, in the ortho or para position to the halogen group. I have discovered that with such a material the replacement can be carried on quickly and efficiently by treatment with urea. For example, 2.4-dinitro-aniline can readily be produced from 2.4-dinitrochlorobenzol, by treating this latter product with urea. I have also found that when this reaction is carried on, cyanuric acid may be produced as a by-product. In a similar way there may be obtained from the corresponding chloro derivatives various compounds such as 1.3-diamino-4.6-dinitrobenzol, 1-chloro-4-amino-3.5-dinitrobenzol, or 1-chloro-2.4-diamino-3.5-dinitrobenzol. It may be noted that the chloro-derivatives corresponding to the two products last mentioned each have one halogen atom which is in neither the ortho or para position to a nitro group. A halogen atom so placed will not be susceptible to substitution by the action of the urea and thus in these instances the body produced is a chloro-aminonitrobenzol instead of the corresponding diamino compound.

As an example of the way in which my invention may be carried out, which is given for illustrative purposes only and is not intended to limit the scope of my invention, the following instance is given:

405 parts (2 mols) of commercial 2.4-dinitrochlorobenzol were heated in a vessel resting in an oil bath, the temperature of the bath being kept at about 240° C. After the material had been melted or fused and thoroughly heated, 300 parts (5 mols) of commercial urea were stirred in as quickly as could conveniently be done. Or the materials may be mixed first and then heated. A lively reaction set in almost immediately and spread very quickly through the entire mass. As soon as the reaction was completed, the mass was allowed to cool and after being ground up was agitated for about two hours with 600 parts of caustic soda (40° Bé.), dissolved, for example, in 1000 parts of water. Relatively large quantities of boiling water might have been used for this step, but the use of the caustic soda solution is more efficient. The liquid was drained off and the residue when washed on a filter and dried was found to comprise in excess of 300 parts of a very pure dinitro-aniline having a melting point of 178° to 179° C.

The filtrate which contained a sodium salt of cyanuric acid was then treated with a mineral acid (for example, about 800 parts of 20° Bé. hydrochloric acid) and the crude cyanuric acid in the form of a yellowish crystalline powder was precipitated and separated by filtration. This crude product was purified by dissolving in boiling water, adding decolorizing carbon and small amounts of hydrochloric acid, filtering, and allowing the acid to recrystallize in the form of large white crystals.

What I claim is:

1. The process which comprises the steps of fusing an aromatic organic compound containing at least one halogen atom and at least one nitro group not in the meta position to such halogen atom, and causing the fused compound to react with a substance of the urea type.

2. The process which comprises the step of fusing an aromatic polynitro compound containing at least one halogen atom and having at least two of the nitro groups not in the meta position to such halogen group, and causing the fused compound to react with a substance of the urea type.

3. A process involving the production of 2.4-dinitroaniline and a solution of a salt of cyanuric acid, which comprises the steps of heating melted 2.4-dinitrochlorobenzol with urea, and separating the soluble and insoluble ingredients.

4. The process of treating an aromatic polynitro compound containing at least one halogen atom which consists in heating it with urea at substantially atmospheric pressure so as to produce an aromatic polynitro compound containing at least one amino group.

5. The process of converting an aromatic polynitro compound containing at least one halogen atom into an aromatic polynitro compound containing at least one amino group which consists in heating it at substantially atmospheric pressure with a substance of the urea type.

KARL H. T. PFISTER.